Nov. 30, 1954 — M. E. ESTEY — 2,695,825
PISTON RING ASSEMBLY
Filed July 20, 1954
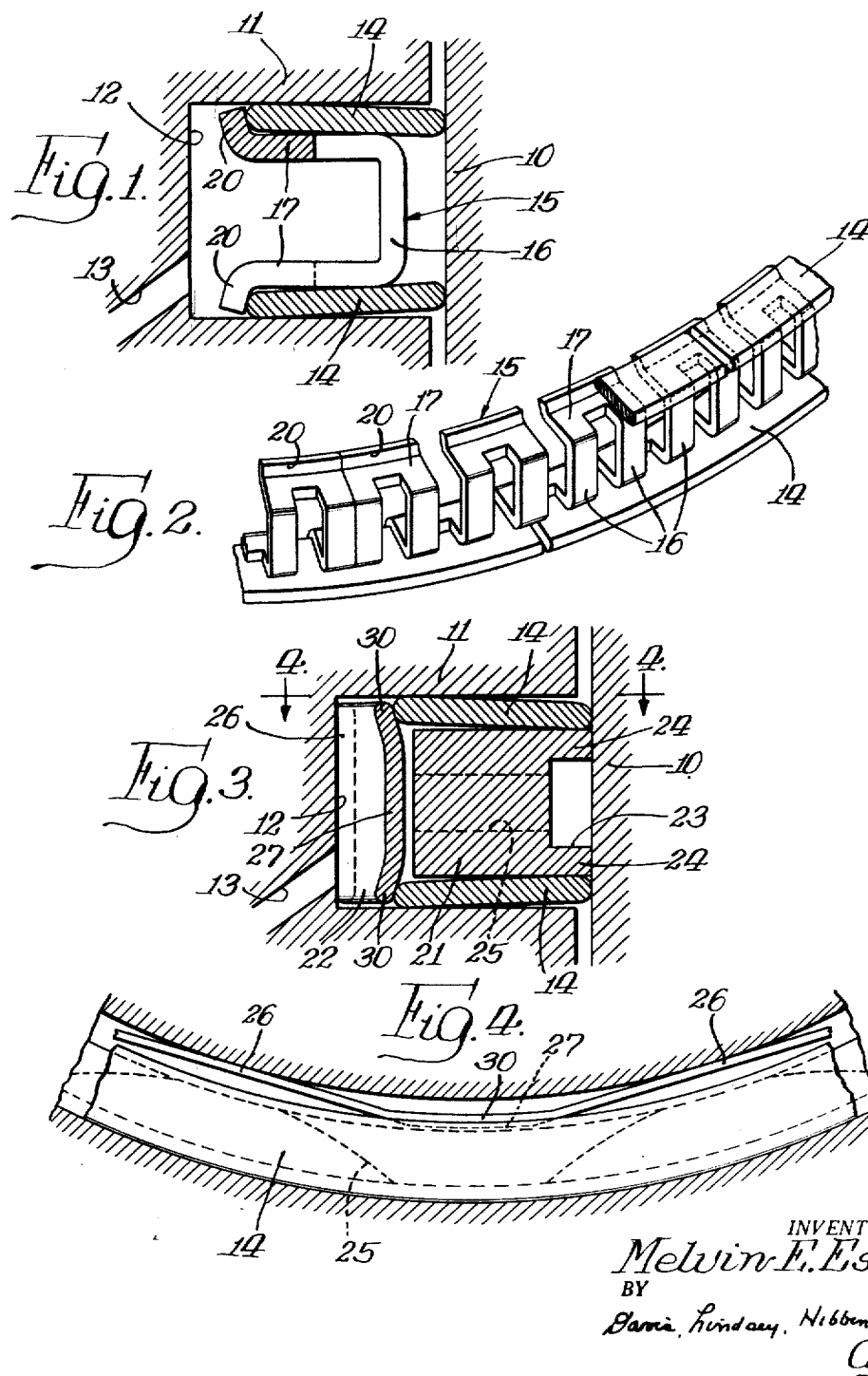
INVENTOR.
Melvin E. Estey,
BY
Davis, Lindsey, Hibben & Noyes
Atty's.

United States Patent Office 2,695,825
Patented Nov. 30, 1954

2,695,825

PISTON RING ASSEMBLY

Melvin E. Estey, Hagerstown, Ind., assignor to Perfect Circle Corporation, Hagerstown, Ind., a corporation of Indiana Application July 20, 1954, Serial No. 444,539

9 Claims. (Cl. 309—45)

The invention relates generally to piston rings and more particularly to an oil ring for an internal combustion engine.

The general object of the invention is to provide a novel piston ring assembly adapted particularly for use as an oil ring and which provides effective oil control.

More particularly, it is an object to provide a novel piston ring assembly adapted for use as an oil ring which prevents flow of oil, particularly in high vacuum operation, between the sides of the groove in the piston and the ring assembly.

Other objects and advantages will become apparent from the following description taken in connection with the accompanying drawing, in which:

Fig. 1 is an enlarged radial sectional view of a piston ring assembly embodying the features of the invention and showing it in position within a ring groove in a piston;

Fig. 2 is a fragmentary perspective view of the ring assembly shown in Fig. 1;

Fig. 3 is a view similar to Fig. 1 but showing another embodiment of the invention; and Fig. 4 is a fragmentary plan view of the ring assembly shown in Fig. 3 and taken along the line 4—4 of Fig. 3.

In the usual ring construction, whether it be of the type comprising a single member or an assembly, there is a slight clearance between the ring and the sides of the groove in the piston so that the ring may freely contract and expand to closely conform to the cylinder wall. However, it has been noted that in many of the newer engines used in automotive vehicles, where a high vacuum condition occurs, there is an excessive oil consumption when the usual type of ring is employed. The usual oil ring construction provides slots or other openings to permit oil scraped from the cylinder wall to flow to the interior of the groove and thence to drain back into the crankcase through passages in the piston extending from the bottom of the groove.

After substantial study of this difficulty, it has been discovered that the high consumption of oil is due to the fact that the oil present in the bottom of the groove behind the piston ring is drawn outwardly through the clearance between the ring and the side of the groove, particularly at the upper side of the groove, by the high vacuum condition existing in the cylinder. I have therefore provided a piston ring structure which effects a seal at the sides of the groove, particularly the upper side, and thereby prevents oil from being drawn outwardly through the clearance at that point.

While a seal at the upper side of the groove is all that is necessary to prevent outward flow of oil due to such high vacuum, there are two reasons why it is desirable, in the preferred embodiment of the invention, to provide for a seal at both sides of the groove. Thus, in a ring assembly comprising a plurality of parts, for effecting a seal only at the upper side of the groove, the various parts have to be mounted in a predetermined manner so that a seal is provided at the upper side of the groove rather than at the lower side. Moreover, if there is no seal at the lower side, more oil can enter the back of the groove than if the ring provided a seal at the lower side. By making a ring which is symmetrical as to the two sides of the groove, there is less chance of the parts of the assembly being incorrectly assembled and a seal is obtained at the upper side of the groove where it is most needed, whichever way the ring is turned. The seal at the lower side of the groove also prevents excess oil entering the back portion of the groove.

The seal effected at the sides of the groove must be such that it does not produce so much friction that the ring will not expand and contract readily to follow the contour of the cylinder wall. Moreover, the parts of the ring assembly must be so shaped that they can readily move as demanded by contraction and expansion of the assembly without undue friction between each other.

Both of the embodiments of the invention shown herein utilize a pair of cylinder-engaging rails. Such rails as normally manufactured have two characteristics which lend themselves to proper operation of the assemblies disclosed herein. Thus rails of the type herein contemplated are usually made with rounded edges. Such edges readily slide against any parts which they contact and thus will not bind as a sharp-cornered edge might do. In making rails of this type, the metal stock is obtained in the form of a straight strip which is cut to the desired length and then bent edgewise so that it will form substantially a circle when confined within the cylinder. With such bending, the metal at the inner periphery of the rail is compressed while the metal at the outer periphery is stretched. This usually leaves the rail with a tendency to dish. Such tendency is utilized in the present embodiments by providing outward pressure on the rails as well as pressure in an axial direction so that the rails will dish toward the sides of the groove preferably at their inner peripheries.

In both embodiments shown herein, the ring assembly comprises a pair of such rails with spacer and expander means for holding the rails in axially spaced relation adjacent the sides of the groove. While the embodiments shown herein are of this construction, it is contemplated that a ring assembly comprising a single rail and a positioning and expander means for holding the rail at one side of a groove is within the scope of the invention. In either form of ring construction having either a pair of rails or a single rail, the positioning or spacer and expander means may be either of the circumferentially expansible type or may comprise a separate spacer or positioning member and a spring.

In the drawing, I have indicated a cylinder wall at 10 and a piston at 11, provided with a piston ring groove 12. A plurality of drain holes, one of which is indicated at 13, may be provided at the bottom of the groove 12 to return oil collected therein through the piston to the crankcase of the engine.

The embodiment shown in Figs. 1 and 2 of the drawing comprises a pair of rails 14 located at the sides of the groove and held in such position by a spacer and expander means comprising a circumferentially expansible member indicated generally at 15. In the preferred form, the member 15 is of U-shape in radial cross section and comprises a plurality of circumferentially spaced web members 16 connected by two axially spaced rows of segments 17. The member 15 is interposed between the two rails 14 and holds them at opposite sides of the groove. The axial height of the member 15 plus the thickness of the two rails 14 is such that there normally would be slight clearance between the rails and the sides of the groove if the rails were to lie flat against the sides of the member 15.

Such clearance would normally permit oil to be drawn from the inner portion of the groove over the upper rail 14 when high vacuum conditions exist in the cylinder of the engine. To prevent this, the combined spacer and expander member 15 is shaped to cause at least the upper rail, and preferably both rails, to bear against the adjacent side, or sides, of the groove. Preferably the rails bear against the sides of the groove only at their inner peripheries so that, while effecting a seal at that point, excessive friction will not be present.

To this end, the combined spacer-expander member 15 is adapted to bear both radially outward and axially against the inner peripheries of the rails 14. To provide this action, the segments 17 in both rails are bent to flare axially towards the sides of the groove at an angle to the sides and to the planes of the rails 14, as indicated at 20. Thus the combined spacer-expander member 15 exerts both a radially outward force component on the rails 14 to cause them to conform to the contour of the cylinder wall and also a force component directed axially on the inner peripheries of the rails. Because of the normal tendency of the rails to dish as heretofore described, the axial force exerted on the rails by the member 15 results in dishing of the rails as clearly illustrated in Fig. 1. Thus only the inner peripheral or marginal portion of the rails 14 will bear against the sides of the groove to effect the seal and very little friction results so that the rails may freely expand and contract to follow the contour of the cylinder walls. The rounded inner edge of the rail bearing against the portions 20 of the segments 17 also provides a contact having very little friction so that the member 15 is free to expand circumferentially and thus move circumferentially relative to the rails during expansion and contraction. The outer rounded edge of the rails provides an easily slidable surface bearing against the cylinder wall regardless of whether the rail lies flat against the sides of the member 15 or is dished as shown in Fig. 1.

The embodiment shown in Figs. 3 and 4 of the drawing is similar to that shown in Figs. 1 and 2 and functions in substantially the same manner, except that the spacer-expander means comprises a spacer member 21 interposed between the two rails to hold them at the sides of the groove, and a spring 22 exerting a force both radially outward and axially against the rails 14. The spacer member 21 in this instance is shown as a cast iron ring member provided with a peripheral groove 23 forming a pair of cylinder-engaging flanges 24. Extending inwardly from the groove 23 are a plurality of slots 25 permitting any oil scraped from the piston wall between the two rails to pass to the inner part of the groove. The spring 22 is preferably of the hump type and comprises a plurality of portions 26 adapted to seat against the bottom of the groove and a plurality of portions 27 bent outwardly and arranged alternately with the portions 26 to bear against the inner peripheries of the rails 14.

To provide both for outward pressure on the rails 14 and to cause them to effect a seal with the sides of the groove, the portions 27 of the hump spring 22 are bent inwardly, as at 30, at an angle to the rails 14. Thus the outward pressure of the spring through the angular portions 30 forces the rails radially outward and also causes the rails to dish towards the sides of the groove at their inner peripheries and thereby effect a seal with the sides of the groove. The rounded inner edge of the rails permits them to readily slide on the sides of the groove and on the portions 30 of the spring while the rounded outer edges of the rails permits them to readily slide on the cylinder wall and on the side surfaces of the spacer 21.

In both embodiments shown in the drawing, the angle of the bent portions 20 and 30 is such that the major component of the force exerted by the spacer-expander means on the rails is in a radial direction. This insures good contact between the rails and the cylinder wall where the sealing or scraping action of the ring is most needed. A sufficient seal at the sides of the groove may be obtained with a lesser force, and the angle of the portions 20 and 30 in the respective embodiments is accordingly made to provide such components of force. It has also been found that engines of different makes require different angles for such portions but in all engines tested the major component of force is exerted radially and the minor component axially. In the present instance the angle of the bent portions 20 and 30 relative to the axis of the piston is shown as on the order of 15°, but the invention is by no means limited to such angle.

From the foregoing description, it will be apparent that I have provided a novel piston ring assembly adapted for use as an oil ring and which is particularly effective in providing oil control. Thus with the rails of both embodiments forming seals with the sides of the groove, oil from the back of the groove is prevented from being drawn into the cylinder by a high vacuum condition. While the rails engage the sides of the groove, undue friction between the rails and the sides is prevented as well as between the rails and other parts of the ring assembly.

I claim:

1. A piston ring assembly comprising a pair of cylinder-engaging rails, and spacer and expander means including portions bearing at an angle to the rails against the inner peripheries of the rails to cause the rails to dish and to spread the rails apart against the sides of the groove and to force them radially outward, and other portions extending between the rails for holding the rails in axially spaced relation.

2. A piston ring assembly comprising a pair of cylinder-engaging rails, each having a rounded inner peripheral edge, and spacer and expander means for holding the rails in axially spaced relation and bearing against the rounded inner edges of the rails at an angle to each rail to force them radially outward and to cause the rails to dish against the sides of the groove, the round edges of the rails facilitating sliding movement of the rails on said means and sliding movement of the rails on the sides of the groove in expanding.

3. A piston ring assembly comprising a pair of cylinder-engaging rails, each having a tendency to dish, and spacer and expander means for holding the rails in axially spaced relation, said means bearing against the inner peripheries of the rails at an angle thereto to cause the rails to dish toward the sides of the groove at their inner peripheries and to force the rails radially outward.

4. A piston ring assembly comprising a pair of cylinder-engaging rails, and a combined spacer and expander comprising a circumferentially expansible structure U-shape in radial cross section with the arms of the U extending inwardly and holding the rails in axially spaced relation, said arms being shaped to force the rails radially outward and to cause the rails to dish to force the inner portions of the rails against the sides of the groove.

5. A piston ring assembly comprising a pair of cylinder-engaging rails, and a combined spacer and expander comprising a circumferentially expansible structure U-shape in radial cross section with the arms of the U extending inwardly and holding the rails in axially spaced relation, the inner ends of said arms having outwardly flaring portions bearing against the inner peripheries of the rails to force them radially outward and to cause the rails to dish against the sides of the groove.

6. A piston ring assembly comprising a pair of cylinder-engaging rails, and a combined spacer and expander comprising a circumferentially expansible structure U-shape in radial cross section with the arms of the U extending inwardly and holding the rails in axially spaced relation, said circumferentially expansible structure comprising a plurality of circumferentially spaced web members connected by segments at the inner ends of the arms of the U, said segments having outwardly flaring portions bearing against the inner peripheries of the rails to force them radially outward and to cause the rails to dish against the sides of the groove.

7. A piston ring assembly comprising a pair of cylinder-engaging rails, a spacer interposed between said rails to hold them in axially spaced relation, and a hump spring having portions adapted to bear against the bottom of the groove and other portions bearing against the inner peripheries of the rails, said other portions being bent to bear at an angle to the rails to force them radially outward and to cause the rails to dish against the sides of the groove.

8. A piston ring assembly comprising a pair of cylinder-engaging rails, each having rounded inner and outer edges and each having a tendency to dish, a spacer interposed between said rails to hold them in axially spaced relation and extending radially outward substantially to the outer edges of the rails, and a hump spring having portions adapted to bear against the bottom of the groove and other portions bearing against the inner edegs of the rails, said other portions being bent to bear at an angle to the rails of force them radially outward and to cause them to dish toward the sides of the groove at the inner peripheries, the rounded inner edges of the rails facilitating movement of the rails on the surface of said other portions on the sides of the groove and the rounded outer edges of the rails facilitating movement of the rails on the side surfaces of said spacer.

9. A piston ring assembly comprising a cylinder-engaging rail, and positioning and expander means for holding said rail at one side of the groove, said means having portions bearing against the inner periphery of said rail at an angle thereto to force the rail radially outward and to dish the rail toward said side of the groove at the inner periphery of the rail.

References Cited in the file of this patent

UNITED STATES PATENTS

| Number | Name | Date |
| --- | --- | --- |
| 1,811,012 | Hodge | June 23, 1931 |
| 2,231,801 | Cords | Feb. 11, 1941 |
| 2,635,022 | Shirk | Apr. 11, 1953 |

Notice of Adverse Decision in Interference

In Interference No. 87,579 involving Patent No. 2,695,825, M. E. Estey, Piston ring assembly, final judgment adverse to the patentee was rendered July 19, 1957, as to claims 1, 2, 3, 4, 5, 6, and 9.
[*Official Gazette August 27, 1957.*]